(12) United States Patent
Kuwa et al.

(10) Patent No.: US 8,179,619 B2
(45) Date of Patent: May 15, 2012

(54) RESIN LENS AND METHOD OF MOLDING RESIN LENS

(75) Inventors: Tadahiro Kuwa, Ibaraki (JP); Hiroaki Usami, Watari-gun (JP)

(73) Assignees: Maxell Finetech Ltd., Miyagi (JP); Hitachi Maxell, Ltd., Osaka (JP)

( * ) Notice: Subject to any disclaimer, the term of this patent is extended or adjusted under 35 U.S.C. 154(b) by 50 days.

(21) Appl. No.: 12/457,385

(22) Filed: Jun. 9, 2009

(65) Prior Publication Data

US 2010/0002315 A1 Jan. 7, 2010

(30) Foreign Application Priority Data

Jul. 3, 2008 (JP) ................................. 2008-174983

(51) Int. Cl.
*G02B 7/02* (2006.01)

(52) U.S. Cl. ...................................................... 359/811

(58) Field of Classification Search .................. 359/811, 359/819, 830

See application file for complete search history.

(56) References Cited

U.S. PATENT DOCUMENTS 6,144,505 A * 11/2000 Nakanishi et al. ............ 359/811
7,012,767 B2 * 3/2006 Yamamoto et al. ........... 359/811

FOREIGN PATENT DOCUMENTS

| JP | U-03-009820 | 1/1991 |
| JP | A-09-131802 | 5/1997 |
| JP | A-2002-131501 | 5/2002 |
| JP | A-2004-191948 | 7/2004 |
| JP | A-2007-265617 | 10/2007 |

OTHER PUBLICATIONS

Decision to Grant in Japan Application No. JP-A-2008-174983 on Apr. 26, 2010 with partial English language translation.
Office Action Issued in Japan Application No. JP-A-2008-174983 on Feb. 8, 2010 with partial English language translation.

* cited by examiner

*Primary Examiner* — Ricky Mack
*Assistant Examiner* — Vipin Patel
(74) *Attorney, Agent, or Firm* — Oliff & Berridge, PLC

(57) ABSTRACT

A resin lens includes an optical functional section that has an optical function, and a flange section that is formed around the optical functional section. A reference face is used as reference during positioning and fixing, and is formed on one face of the flange section. The face on which the reference face is formed is molded by an insert that mainly forms the optical functional section and a holder that mainly forms the flange section, during molding. The reference face of the flange section and an optical functional face that is the face of the optical functional section facing the reference face are molded by the insert, and a face of the flange section that is closer to the outer periphery than the reference face of the flange section is molded by the holder.

9 Claims, 4 Drawing Sheets

[Fig. 1]
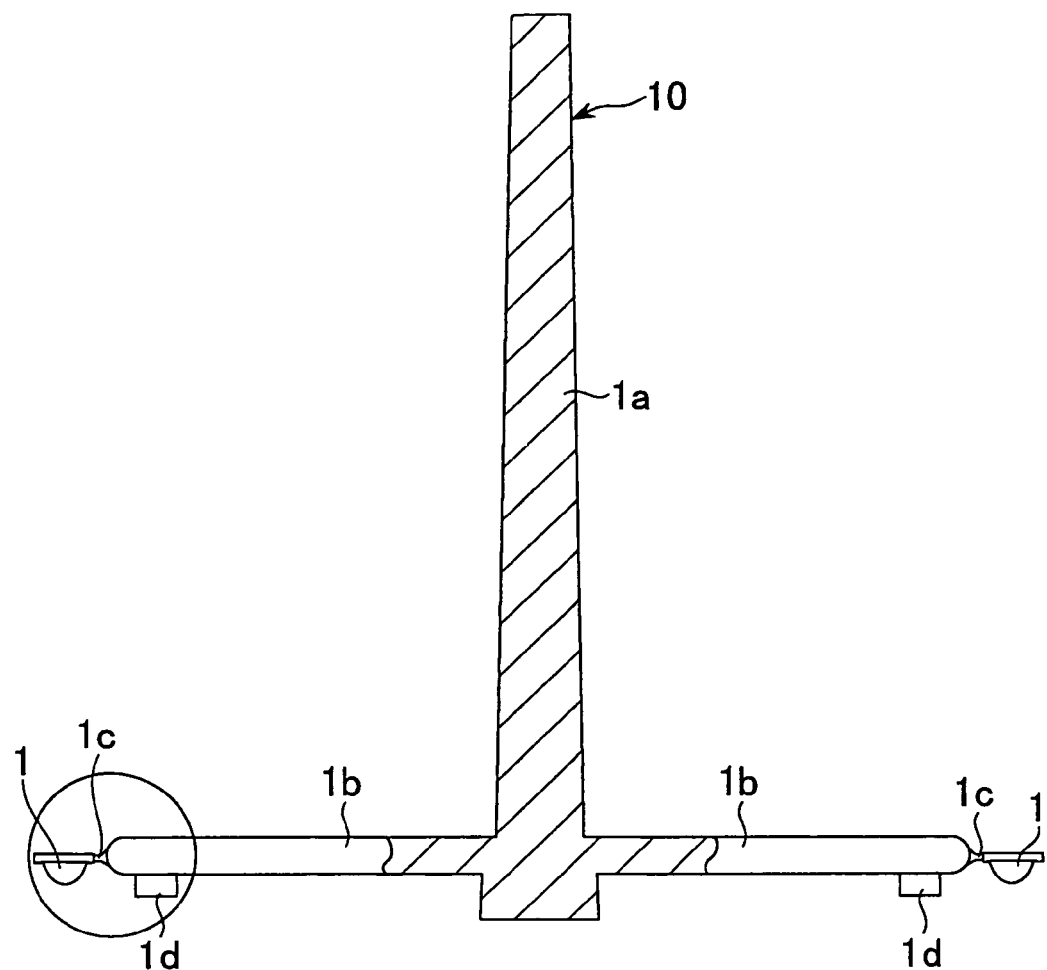

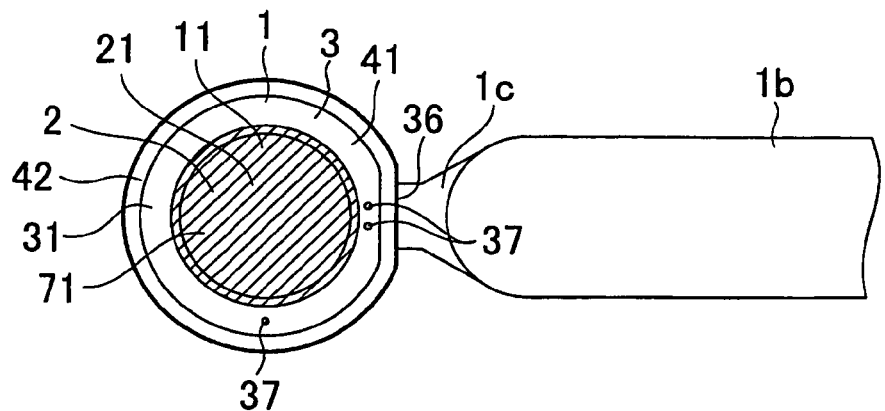
[Fig. 2A]
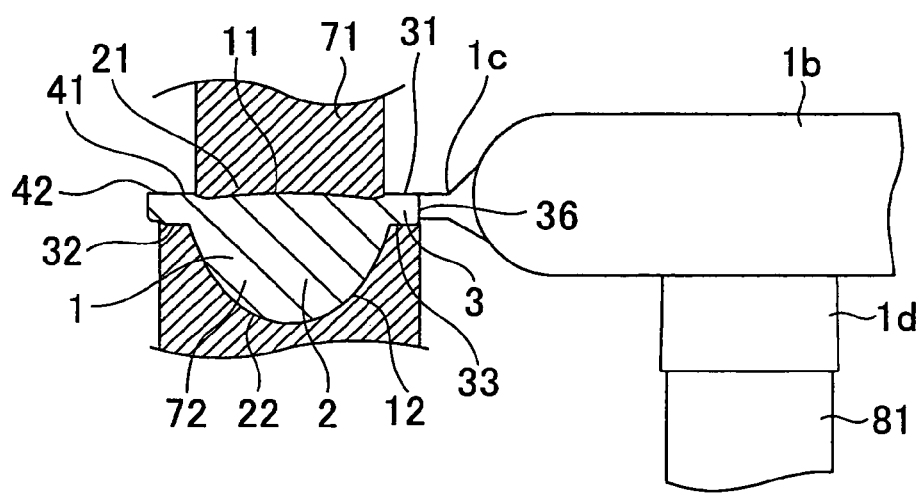
[Fig. 2B]
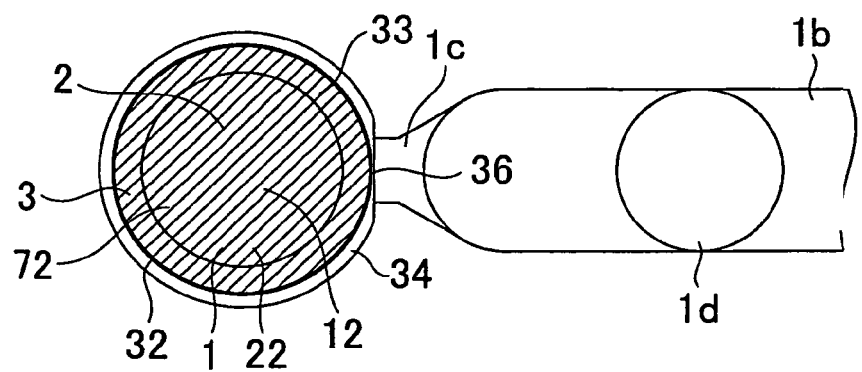
[Fig. 2C]

[Fig. 3A]
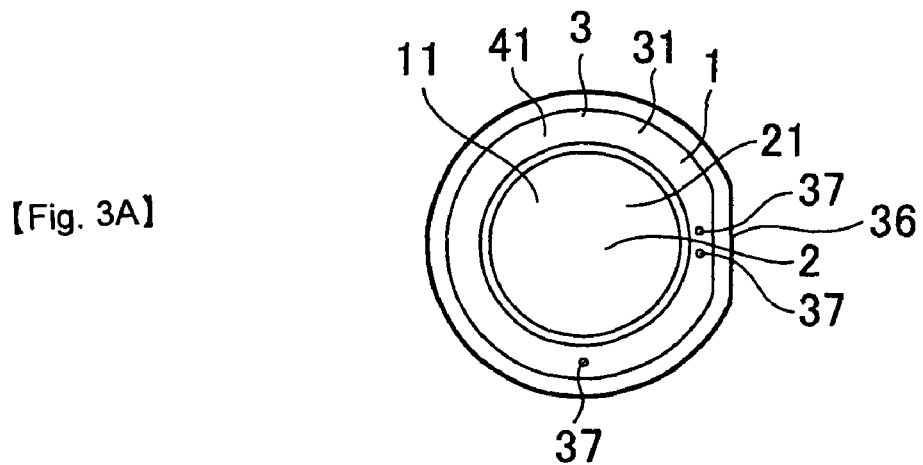
[Fig. 3B]
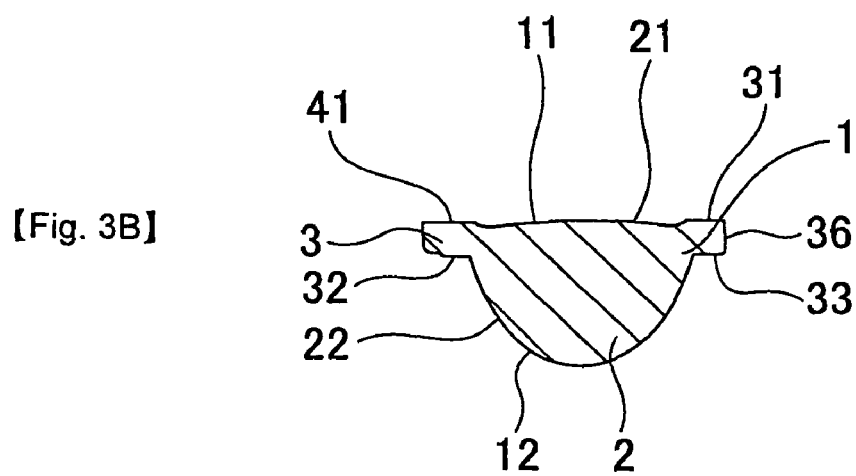
[Fig. 3C]
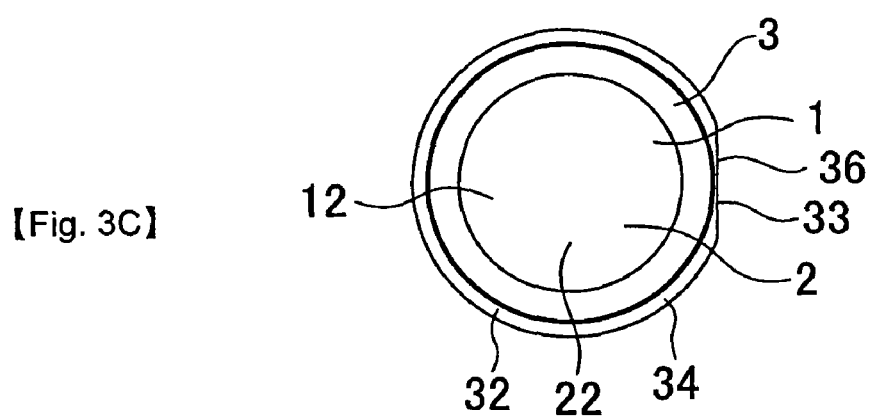

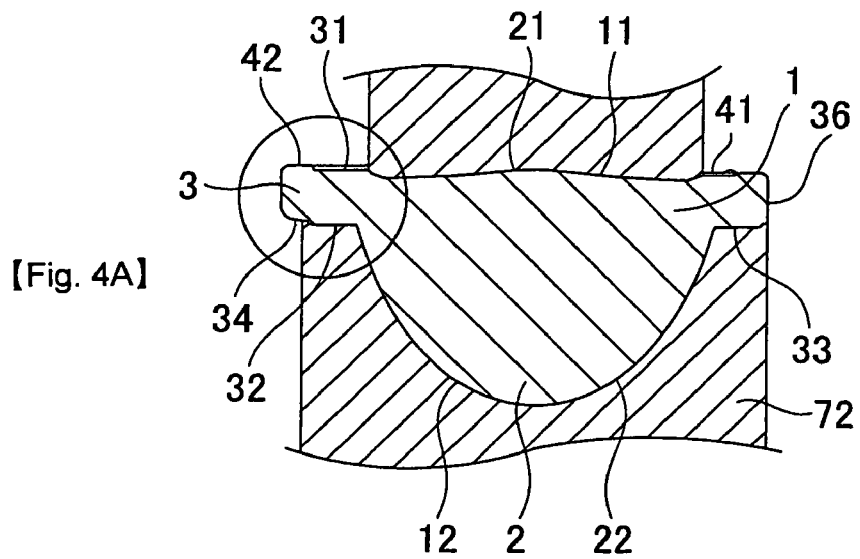
[Fig. 4A]
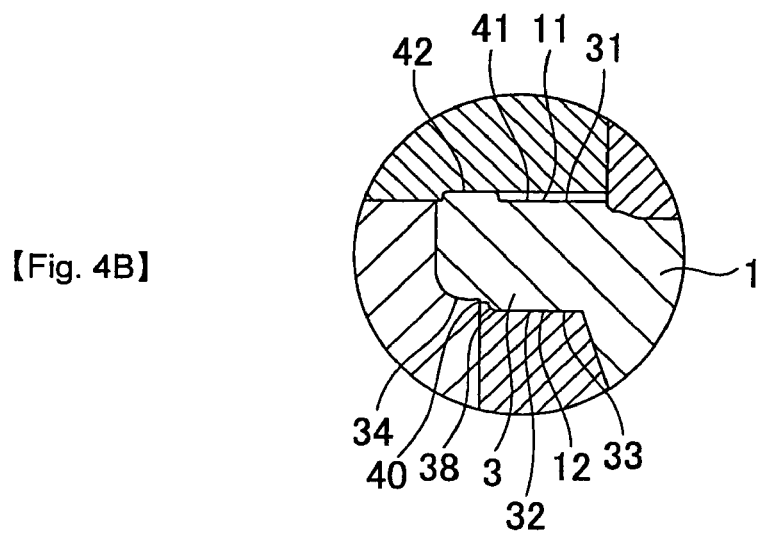
[Fig. 4B]
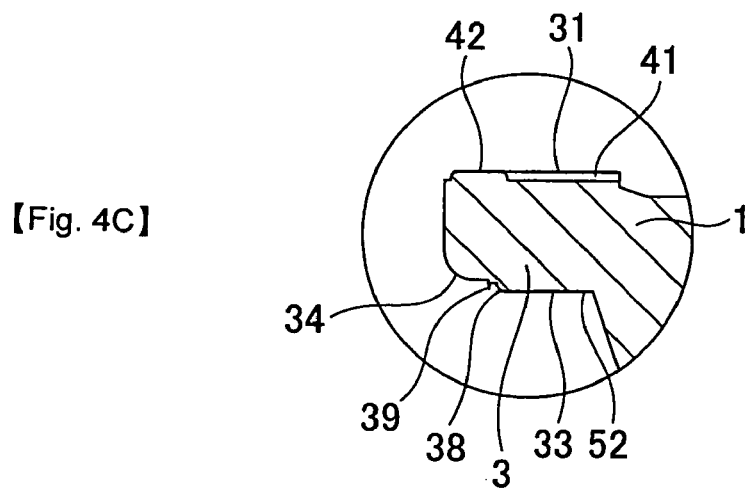
[Fig. 4C]

RESIN LENS AND METHOD OF MOLDING RESIN LENS

BACKGROUND OF THE INVENTION

1. Field of the Invention

The present invention relates to a resin lens made of a resin and a method of molding a resin lens, and more particularly, to a resin lens that is suitable for an objective lens (pickup lens) of an optical pickup device for an optical disc and a method of molding a resin lens.

2. Description of the Related Art

In recent years, for example, a resin lens made of a thermoplastic resin instead of a glass-molded lens has been used as an objective lens, which is used for an optical pickup device for the reading or writing of an optical disc such as a Blu-ray disc, DVD, and CD. The objective lens is molded by, for example, injection molding.

Further, the resin lens, which is used as the objective lens of the optical pickup device, includes, for example, an optical functional section that has an optical function such as a condensing function, and a flange section that is used for positioning and fixing the lens to an optical device. Meanwhile, for example, the flange section is formed in the shape of a flange on the outer periphery of the optical functional section.

Furthermore, since the resin lens used as the objective lens is disposed close to an optical disc, for example, the resin lens is mounted on the end of a mounting frame (pickup holder) on which the objective lens of the optical pickup device is mounted. In this case, for example, the optical functional section of the resin lens is disposed on the inner periphery of the mounting frame, the flange section is disposed on a frame part of the mounting frame, and the flange section is fixed to the frame part of the mounting frame by, for example, an adhesive or the like.

In this case, an annular portion of the flange section of the resin lens, which comes in contact with the mounting frame, functions as a reference face. The reference face of the flange section of the resin lens comes in contact with the mounting frame, so that the resin lens is positioned (for example, Japanese Patent Application Laid-Open No. 2004-191948).

Accordingly, the resin lens is designed so that the position or gradient (optical axis direction) of the resin lens is set when the reference face of the resin lens comes in contact with a corresponding receiving face to the mounting frame.

Further, an injection mold includes cavities, a sprue, runners, and gates. The cavities mold portions that form resin lenses, and a resin is injected through the sprue so that the cavities are filled with the resin. The resin is supplied to a plurality of cavities, which is provided to obtain a number of resin lenses, from the sprue through the runner. The gates are formed between the runners and the cavities. Accordingly, a molded product, which is extracted from the injection mold, is obtained by filling the sprue, the runners, the gates, and the cavities with a resin and hardening the resin by cooling. In order to obtain the resin lens, it is necessary to cut a gate section, which is formed at the gate and connected to the resin lens molded by the cavity, and to cut out the resin lens from the molded product. Meanwhile, since the gate section is generally formed at one position on the outer peripheral portion of the resin lens, the resin lens cut out from the molded product has a cut portion at one position on the outer periphery.

The cut portion may be used as a reference position in the circumferential direction of the resin lens.

Further, the outer edge of the resin lens basically forms a circular shape, but a part of a circle is deformed due to the cut portion.

In this case, the following resin lens has been known. In the resin lens, a linear portion having a shape, which is obtained by cutting the outer edge of the resin lens in a direction orthogonal to a radial direction, is previously formed at a portion, where the cut portion is formed, of the outer edge of the resin lens, that is, the outer edge of the flange section. The linear portion of the flange section is not formed by cutting the gate section, but molded by the shape that is previously formed in the mold for molding the flange section. The gate section is cut along the linear portion. In this case, since having a shape that is obtained by cutting the outer periphery of the circular resin lens along a straight line orthogonal to the radial direction, the linear portion is formed inside a virtual circle along the outer periphery of the resin lens. Accordingly, the cut portion of the gate section may not protrude from the virtual circle along the outer periphery of the resin lens, and a cutting mark of the gate section does not interfere with the mounting of the resin lens on the optical device.

Meanwhile, in a mold for the objective lens, the portion, which forms the optical functional section closer to the inside than at least the flange section, functions as an insert and is rotatable relative to the mold. That is, in an injection mold that includes a movable mold and a stationary mold and is opened when a molded product is extracted, at least a portion, which forms the optical functional section of the resin lens, of the cavity for molding the resin lens is provided in the stationary mold and the movable mold as a cylindrical insert.

Further, the insert is formed in a cylindrical shape and is rotatable. Accordingly, when the circular optical functional section is formed, it may be possible to adjust the rotation angle of the insert so that optimum optical performance is exerted by the rotation of the insert. Meanwhile, inserts are provided in both the movable mold and the stationary mold, and face each other. Accordingly, if the rotation angles of the pair of inserts are adjusted, there are possibilities that the error of the central position, other shape errors, and the eccentricity or gradient of the insert that is rotatably received in a hole of the holder of the mold with a clearance may be changed and the shape of the molded resin lens may be slightly changed, thereby causing difference in the optical property of the resin lens. Therefore, it may be possible to optimize the optical property by adjusting the rotation angle of the insert.

Further, in the resin lens that includes the optical functional section and the flange section, the central face of the resin lens, which forms at least the optical functional section, is formed by the forming face of the insert, and the flange section, which is closer to the outer periphery than the optical functional section of the resin lens, is formed by the forming face of a peripheral portion (holder) of the portion into which the insert of the mold is inserted. Accordingly, the reference face, which is formed on the flange section, is also formed by not the insert but the holder.

In this case, the clearance, which allows the insert to rotate, is formed between the insert and the holder. Due to the clearance, the axial direction of the insert is slightly misaligned from the axial direction of the hole into which the insert of the holder is inserted, so that the insert is slightly inclined (tilted). Further, the direction of the inclined insert is changed by rotating the insert. Accordingly, the surface shape of the optical functional section, which is formed by the forming face of the insert, is changed by the rotation of the insert.

In contrast, since the holder is not rotated, the shape of the outer surface of the flange section formed by the forming face of the holder is not changed even though the insert is rotated.

Accordingly, errors in manufacturing the mold or errors caused by the molding, and errors caused by the rotation of the insert are added to each other between the reference face molded by the holder and the optical functional section molded by the insert. For this reason, there is a possibility that an error of an angle between the reference face and the optical axis of the optical functional section may be increased, which interferes with the development of another resin lens having high accuracy.

SUMMARY OF THE INVENTION

The present invention addresses the above-identified, and other problems associated with conventional methods and apparatuses. An object of the present invention is to provide a resin lens, which is more excellent in an optical property, by further improving accuracy.

In order to achieve the above-described object, according to a first aspect of the invention, there is provided a resin lens that includes an optical functional section having an optical function and a flange section formed around the optical functional section. A reference face is positioned and fixed at the flange section when the resin lens is assembled with an optical device, is used as reference during the positioning and fixing, and is formed on one face of the flange section. The face on which the reference face is formed is molded by a first mold that mainly forms the optical functional section and a second mold that mainly forms the flange section, during molding. The reference face is formed in an annular shape at a position that is close to the inner periphery of the flange section. The reference face of the flange section and an optical functional face that is the face of the optical functional section facing the reference face are molded by the first mold, and a face of the flange section that is closer to the outer periphery than the reference face of the flange section is molded by the second mold.

In the first aspect of the invention, the reference face of the flange section and an optical functional face that is the face of the optical functional section facing the reference face are molded by the first mold. Accordingly, even though the first mold is rotated as an insert, the gradient of the insert caused by the rotation of the insert affects the reference face and the optical functional face at the same time, so that the angle between the reference face and the optical functional face is not affected. Therefore, when a rotatable insert is used as the first mold, it may be possible to prevent the error (change) of the angle between the reference face and the optical functional face by the gradient of the insert that is caused by the rotation of the insert, and to further improve the accuracy of the resin lens.

Further, even though the insert is rotated, the gradient of the optical axis direction of the optical functional face with respect to the reference face is not changed. When the resin lens is assembled with an optical device based on the reference face, the misalignment of the optical axis direction caused by the rotation angle of the insert does not occur and it may be possible to suppress the deviation of the quality of the optical device.

Furthermore, according to a second aspect of the invention, in the first aspect of the invention, the flange section may be formed in a substantially circular shape, may be molded by the second mold so as to correspond to a portion to be cut after molding, and may include a linear portion having a shape that is obtained by cutting a circular outer periphery in a direction substantially orthogonal to a radial direction. In addition, an outer diameter of the annular reference face formed by the first mold may be smaller than a distance between the center of the optical functional section and the linear portion in the radial direction.

If the linear portion is formed, it may be possible to prevent the cutting marks of the gates from interfering with the mounting of the resin lens on the optical device as described above.

Herein, in order to prevent the optical functional face from being inclined with respect to the reference face, it is considered that the faces of the optical functional section and the flange section facing the reference face are formed by one insert. In this case, it is difficult to previously form a linear shape at a portion of the flange section where the gate is cut. That is, if a portion up to the outer edge of the flange section is formed by one insert and a linear portion is formed at the circular outer edge of the flange section, the forming face of the first mold forming the insert is formed in a non-circular shape and the insert may not be rotated.

In this case, if the outer diameter of the annular reference face formed by the first mold is set to be smaller than the distance between the center of the optical functional section and the linear portion in the radial direction, it may be possible to form the forming face of the first mold, which forms the insert, in a circular shape by molding a portion up to the outer edge of the flange section by using the first mold. That is, even though the insert is rotated, the shape of the forming face is not changed.

Further, even though the linear portion of the outer edge of the flange section is molded by the second mold used as the holder that is not rotated, the linear portion is formed at the outer edge of the flange section of the resin lens, and the first mold forming the insert is rotated, it may be possible to integrally mold the reference face and the optical functional face without problems.

According to a third aspect of the invention, in the first aspect of the invention, assuming that a distance in an optical axis direction from a predetermined reference face that is orthogonal to the optical axis and positioned within thickness is represented as height, a border that is formed between the portion molded by the first mold and the portion molded by the second mold may be positioned close to the outer periphery than the reference face and a portion including the border may be lower than the reference face at a position that is close to the outer periphery than the reference face.

In the second aspect of the invention, when a clearance is formed between the first and second molds and a burr is formed at the border between the first and second molds in the resin lens that is molded by the first and second molds, a portion where a burr is formed is lower than the reference face. If the length of the protruding burr is smaller than the difference in height between the reference face and the border where the burr is formed, the mounting accuracy of the resin lens is not affected without interference when the reference face comes in contact with the receiving face of the mounting frame.

Accordingly, when the reference face comes in contact with the receiving face of the mounting frame, the deterioration of accuracy is prevented and the burr does not need to be removed. Therefore, it may be possible to prevent the increase of cost that is caused by the increase of the number of processes for manufacturing the resin lens.

Further, according to a fourth aspect of the invention, in the third aspect of the invention, the difference in height between the reference face and the portion including the border, which is lower than the reference face at a position close to the outer periphery than the reference face, is larger than a length of a burr that is made of a resin permeated into a clearance between the first and second molds and protrudes in an optical axis direction.

In the third aspect of the invention, the difference in height between the reference face and the border is larger than the length of a burr that is made of a resin permeated into the clearance between the first and second molds and protrudes in the optical axis direction. Accordingly, a burr does not protrude from the reference face, and the interference with a burr does not occur when the resin lens is fixed to the mounting frame of the optical device and the reference face comes in contact with the receiving face.

Meanwhile, for example, it may be possible to experimentally obtain the height of a burr in molds having the same insert structure. Further, the change of the length of a burr, which is caused by the size of a clearance between the insert and the holder or other factors, may be experimentally obtained in advance, an experimental formula may be made based on the experiment, and the height of a burr may be estimated based on the experimental formula.

According to a fifth aspect of the invention, there is provided a method of molding a resin lens that includes an optical functional section that has an optical function, and a flange section that is formed around the optical functional section. A reference face is positioned and fixed at the flange section when the resin lens is assembled with an optical device, is used as reference during the positioning and fixing, and is formed on one face of the flange section. The method includes forming the reference face in an annular shape at a position that is close to the inner periphery of the flange section; molding the face on which the reference face is formed by a first mold that mainly forms the optical functional section and is rotatable about a rotation center along an optical axis of the resin lens, and a second mold that mainly forms the flange section and includes a circular hole during the molding of the resin lens; molding the reference face of the flange section and an optical functional face, which is the face of the optical functional section facing the reference face, by the first mold; and molding a face of the flange section, which is closer to the outer periphery than the reference face of the flange section, by the second mold. The first mold is rotatably held by the circular hole.

In the fifth aspect of the invention, it may be possible to obtain the same advantages as the first aspect of the invention.

According to the present invention, the resin lens includes a mold that forms an optical functional section having an optical function, and a flange section that is formed around the optical functional section so as to mount the optical functional section on the optical device. The resin lens includes a reference face that is used for positioning when being mounted on the flange section. If the reference face and the optical functional face of the optical functional section facing the reference face may be formed by a first mold, it may be possible to prevent an error, which is generated in the gradient of the optical functional section with respect to the reference face, by the gradient of the insert when a rotatable insert is used as the first mold.

Further, in this case, both the faces of the optical functional section and the flange section facing the reference face are not formed by the first mold, and the reference face is formed in an annular shape at a position that is closer to the inside than the outermost peripheral portion of the flange section and closer to the inside than the linear portion formed at the outer edge of the flange section. A portion on which the optical functional face and the reference face are formed may be formed in a circular shape so as to be rotated. Therefore, it may be possible to hold the insert while allowing the insert to rotate.

BRIEF DESCRIPTION OF THE DRAWINGS

FIG. 1 is a cross-sectional view of a molded product including resin lenses when the resin lens according to an embodiment of the present invention is formed;

FIG. 2 shows a portion that corresponds to the resin lens and is surrounded by a circle in FIG. 1 and a part of an insert of a mold that is used to form the resin lens, wherein FIG. 2A is a front view, FIG. 2B is a side view, and FIG. 2C is a rear view;

FIG. 3 shows the resin lens and a part of an insert of a mold that is used to form the resin lens, wherein FIG. 3A is a front view, FIG. 3B is a side view, and FIG. 3C is a rear view; and FIG. 4 shows the resin lens and a part of an insert of a mold that is used to form the resin lens, wherein FIG. 4A is a side view, FIG. 4B is an enlarged view of a portion that is surrounded by a circle in FIG. 4A, and FIG. 4C is an enlarged view of the portion that is surrounded by a circle in FIG. 4A except an insert.

DESCRIPTION OF THE PREFERRED EMBODIMENT

An embodiment of the present invention will be described below with reference to drawings.

A molded product, which forms a resin lens according to this embodiment, will be described first. FIGS. 1, 2A, 2B, and 2C are views showing a molded product that includes resin lenses according to this embodiment. FIGS. 3A and 3B are views showing a relationship between the resin lens according to this embodiment and an insert of an injection mold. FIGS. 4A, 4B, and 4C are views illustrating a burr of the resin lens according to this embodiment.

As shown in FIGS. 1 and 2, the resin lens 1 according to this embodiment is formed by injection molding, and a plurality of (for example, four or eight) resin lenses 1 is obtained from one molded product 10.

Further, the molded product 10 is formed so as to correspond to a sprue, runners, and gates of an injection mold. A resin is injected through the sprue so that a resin (for example, thermoplastic resin) is introduced into cavities used for forming the resin lenses 1. The runners are branched off from the sprue toward a plurality of cavities, and a resin is distributively introduced into the cavities through the runners. The gates are formed between the runners and the cavities. Accordingly, the molded product 10 includes a sprue section 1a that is formed at the sprue, runner sections 1b that are formed at the runners, gate sections 1c that are formed at the gates, and the resin lenses 1 that are formed and molded at the cavities.

Meanwhile, the injection mold includes a stationary mold and a movable mold. When molding is performed, the stationary mold and the movable mold abut against each other so as to hermetically seal a portion that is to be filled with a resin forming the molded product 10. When the molded product 10 is hardened to some extent by cooling after the resin is filled, the movable mold is moved to be separated from the stationary mold so that the injection mold is opened. Accordingly, the portion filled with a resin is opened and the molded product 10 is extracted. In this case, the molded product 10 is generally separated from the stationary mold of the stationary mold and the movable mold of the opened injection mold, and is held by the movable mold.

For this reason, the molded product 10 has a shape that is more easily separated from the stationary mold than the movable mold when the stationary mold and the movable mold are compared with each other.

In other words, the molded product has a shape that is apt to remain in the movable mold. For example, the molded product has a shape where runner locks 1d are formed at the runner sections 1b and the runner sections 1b are apt to remain in the movable mold including portions used for forming the runner locks 1d. Meanwhile, a border between the movable mold and the stationary mold corresponds to the portion of the runner section 1b of the molded product shown in FIG. 1 that corresponds to the central axis parallel to the axial direction of the runner section 1b.

While the molded product is held in the movable mold, an ejector pin 81, which ejects the molded product 10 when the molded product 10 is extracted from the movable mold, comes in contact with the runner lock 1d as shown in FIG. 2B. Accordingly, the runner lock 1d of the runner section 1b is ejected by the ejector pin 81.

Further, as shown in FIGS. 2 to 4, the resin lens 1 is used as a pickup lens (objective lens) of an optical pickup device for Blu-ray disc.

Herein, in the description of the shape of the resin lens 1, a predetermined reference face, which is orthogonal to an optical axis and positioned within the thickness, is represented as a flat surface along a parting line between the stationary mold and the movable mold, and a distance from the reference face in an optical axis direction is represented as height. Meanwhile, if an object is distant from the reference face, the height of the object is large. If an object is close to the reference face, the height of the object is small. Further, a distance from the reference face is represented as height as for both a first face 12 and a second face 11 to be described below.

The resin lens 1 functioning as a pickup lens includes an optical functional section 2 that has an optical function such as a condensing function, and a flange section 3 that is formed around the optical functional section 2 so as to have the shape of a flange.

Further, the resin lens 1 includes a second face 11 that faces an optical disc on which information is read or written, and a first face 12 where light emitted from a light source enters. The resin lens includes optical functional faces 21 and 22 that form the surfaces of the optical functional section 2, and flange faces 31 and 32 that form the surfaces of the flange section 3.

That is, the central portion of the second face 11 forms the optical functional face 21, the outer peripheral portion of the second face forms the flange face 31, the central portion of the first face 12 forms the optical functional face 22, and the outer peripheral portion of the first face forms the flange face 32.

Further, the optical functional face 21 of the optical functional section 2 corresponding to the second face 11 is disposed close to an optical disc, and is curved in a gentle convex shape. Furthermore, at least a part of the flange face 31 of the flange section 3 corresponding to the second face 11 is higher than the optical functional face 21 corresponding to the second face 11, and the flange section 3 further protrudes toward the optical disc than the optical functional section 2.

In this embodiment, a mirror portion 41 and marks 37 are provided on the flange face 31, which faces an optical disc, of the flange section 3 of the second face 11 of the resin lens 1.

Meanwhile, since the flange face 31 faces the optical disc, the marks 37 are exposed to the outside so as to be recognized even though the resin lens 1 is mounted on a mounting frame of an optical pickup device. Further, when the resin lens 1 is fixed to the mounting frame, the mirror portion 41 is irradiated with light and light reflected by the mirror portion 41 is recognized by a predetermined sensor. Accordingly, it may be possible to measure the gradient of the resin lens 1 mounted on the mounting frame.

The marks 37 are provided on the mirror portion 41, so that it may be possible to specify a mold that is used to manufacture the resin lenses 1 and cavities of the mold.

Further, on the first face 12 of the resin lens 1, the optical functional face 22 of the optical functional section 2 is curved and significantly protrudes toward the side (the side opposite to the optical disc) that is irradiated with a laser of a light source.

Further, the resin lens 1 is mounted on the optical pickup device. However, the mounting position of the resin lens 1 is a position closest to the optical disc in the optical pickup device, and the flange section 3 of the resin lens 1 is fixed to the mounting frame (pickup holder). Meanwhile, in this case, the flange face 32 of the flange section 3, which forms the first face 12 of the resin lens 1, comes in contact with the end face of the mounting frame, and, for example, is fixed to the end face of the mounting frame by adhesion. Further, the optical functional section 2 corresponds to an internal space of the mounting frame and can transmit light.

Further, the flange face 32 includes a reference face 33 that is continuously provided at the outer periphery of the optical functional face 22. The reference face 33 basically does not include the outermost peripheral portion 34 of the flange face 32. Meanwhile, the outermost peripheral portion of the flange section 3 has a linear portion 36, which has not an arc shape but a linear shape, formed at the substantially circular outermost peripheral portion at a portion where the gate section 1c is cut. The linear portion has a shape that is obtained by cutting a circular outer periphery along a line orthogonal to the radial direction of the resin lens 1.

Since the gate section 1c is cut along the linear portion 36, the cut surface of the gate section 1c is formed along the linear portion 36. Accordingly, even though the outer periphery of the resin lens 1 has a circular shape except for the linear portion 36, the cut portion does not protrude outside the substantially circular outer periphery of the resin lens 1 when the gate section 1c is linearly cut (the cut portion protrudes from the linear portion 36, but does not protrude from a virtual circle at the linear portion 36 along the outer periphery except for the linear portion 36). Further, it may be possible to determine the direction of the resin lens 1 (the position in a circumferential direction) by the linear portion 36 that includes the cut portion of the gate section 1c.

That is, the linear portion 36 may be used as a reference position in the circumferential direction of the resin lens 1. In other words, regardless of the cut portion, the linear portion may be deemed as the reference of the position in the circumferential direction of the resin lens 1 that is formed by a mold.

Further, in this embodiment, the linear portion 36 is orthogonal to the radial direction of the resin lens 1. Furthermore, the annular and belt-like reference face 33 has a predetermined width in the radial direction of the flange section 3. However, the outer diameter of the reference face is slightly smaller than the shortest distance (a distance in the radial direction) between the center of the resin lens 1 and the linear portion 36. That is, as described above, the reference face 33 is closer to the center than the outermost peripheral portion 34 of the flange face 32 that corresponds to the reference face 33 of the flange section 3, and is closer to the center than the linear portion 36. That is, the outer diameter of the annular reference face 33, which is formed by an insert 71 (first mold)

is smaller than a distance between the center of the optical functional section 2 and the linear portion 36 in the radial direction.

Further, the outline of the reference face 33 forms a circle at a position that is closer to the center than the linear portion 36.

Furthermore, the reference face 33 forms a flat surface that is orthogonal to the optical axis of the resin lens 1.

A forming face, which forms the second face 11 of the resin lens 1 during the molding of the resin lens 1, is basically formed on the stationary mold. A forming face, which forms the first face 12 of the resin lens, is formed on the movable mold. A cavity of the injection mold is formed by the two forming faces.

Further, the optical functional face 21, which corresponds to the second face 11 of the resin lens 1, is basically molded by the cylindrical insert 71 that is provided in the stationary mold. Furthermore, the optical functional face 22, which corresponds to the first face 12 of the resin lens 1, is molded by a cylindrical insert (first mold) 72 that is provided in the movable mold. Meanwhile, the inserts 71 and 72 are hatched in FIG. 2B. Further, a portion of the resin lens 1, which is formed by the forming face of the insert 71 or 72, is hatched in FIGS. 2A and 2C.

On the second face 11 of the resin lens 1, the optical functional face 21 is molded by the insert 71, and the flange face 31 formed around the optical functional face is formed by a mold that forms a holder including a hole into which the insert 71 is inserted.

In contrast, on the first face 12 of the resin lens 1, the optical functional face 22, the reference face 33 that forms the inner periphery of the flange face 32 formed around the optical functional face, and a portion that forms the slightly outer periphery of the flange face are molded by the insert 72. Accordingly, the optical functional face 22 and the reference face 33 are molded by the insert 72 that forms an integrally formed mold.

Further, the outline of the reference face 33 forms a circle as described above. Accordingly, the insert 72 (first mold) is also formed in a cylindrical shape so as to have a circular forming face that corresponds to the outline of the reference face 33, and may be rotated in the holder (second mold).

Furthermore, the outermost peripheral portion 34, which is closer to the outer periphery than a portion that is slightly closer to the outer periphery than the reference face 33 of the flange face 32, is formed by a mold (second mold) that forms a holder including a hole into which the insert 72 is inserted. Meanwhile, since the mold, which forms the holder, does not need to be rotated. Therefore, the mold, which forms the holder, does not need to be formed in a cylindrical shape.

A burr, which is formed during the molding of the resin lens 1 according to this embodiment, will be described below with reference to FIG. 4.

FIG. 4A is a cross-sectional view showing the resin lens 1 and the inserts 71 and 72, FIG. 4B is an enlarged view of the flange section 3 that is surrounded by a circle in FIG. 4A, and FIG. 4C is an enlarged view of the flange section 3 that is separated from the inserts 71 and 72.

Further, the height of the reference face 33 is different from the height of the face of the outermost peripheral portion 34 that faces the reference face 33. The reference face 33 is higher than the face of the outermost peripheral portion, and the face of the outermost peripheral portion 34 is lower than the reference face. A step 38 is formed between the reference face and the face of the outermost peripheral portion. Meanwhile, the step 38 corresponds to a concept that includes a slope.

Further, the step 38 is formed over the entire periphery of the flange face 32. A border 40 between a portion that is molded by the insert 72 and a portion that is molded by the holder is slightly closer to the outside than the step 38. Accordingly, the step 38 is molded by the insert 72.

Furthermore, a slight clearance is formed between the inner peripheral surface of the holder and the outer peripheral surface of the insert 72 so as to allow the insert 72 to rotate. Accordingly, as shown in FIG. 4C, when the cavity is filled with a resin, a resin is permeated into the clearance at a portion that forms the border 40 between the portion molded by the insert 72 and the portion molded by the holder, so that a burr 39 is formed at this portion of the resin lens 1.

The length of the burr 39 protruding in the optical axis direction is shorter than the difference in height between the reference face 33 that forms an inner peripheral portion of the step 38 and the outermost peripheral portion 34, so that the burr 39 is lower than the reference face 33 that forms the upper portion of the step 38.

Accordingly, when the reference face 33 comes in contact with a receiving face of the mounting frame of the optical pickup device, the burr 39 does not come in contact with the receiving face.

Meanwhile, in this embodiment, it may be possible to suppress the length of the burr 39 protruding to 0.03 mm or less by manufacturing conditions, such as a set value of the clearance, the composition of a resin, the temperature of a resin to be injected, and the like. Accordingly, the step may be set to 0.04 mm. These values are illustrative, and it is preferable that the height of the step be larger than the length of the burr 39 protruding.

Meanwhile, a step, of which the outer portion in the radial direction is low, is also formed at a portion corresponding to the border 40.

In this case, the insert 72 and the holder come in contact with each other at the border 40. However, even though the insert and the holder are designed so that a step is not formed at the portion corresponding to the border, there is a possibility that a step may be formed due to the manufacturing errors of the insert 72 and the holder, errors during the assembly of the insert and the holder, and the like. In this case, if the outer peripheral portion becomes higher than the border 40 of the outermost peripheral portion 34 that is molded by the holder, the difference in height becomes small between the outer peripheral portion and the border 40 that is formed between the reference face 33 and the outermost peripheral portion 34. In this case, if a step is formed at the border 40, the burr 39 formed at the border 40 becomes higher than the upper portion of the step. If the difference in height becomes small between the outer peripheral portion and the border 40 that is formed between the reference face 33 and the outermost peripheral portion 34, there is a possibility that the burr 39 may become higher than the reference face 33.

Further, if the positions of the forming faces of the insert 71 and the holder are previously set at the border 40 so that the portion molded by the insert 71 is molded to be higher than the border 40 of the first face 12 (flange face 32) of the resin lens 1 and the portion molded by the holder is molded to be lower than the border, it may be possible to prevent the difference in height between the reference face 33 and the border 40 and the outer face from becoming smaller than the difference in height at the step 38 even though the forming face of the insert 71 is misaligned from the forming face of the holder due to errors. Therefore, it may be possible to reliably prevent the burr 39 from becoming higher than the reference face 33.

Meanwhile, the positions of the forming faces of the holder and the insert 72 may be basically adjusted in height. Accordingly, if the step of the border 40 is previously set, the above-mentioned problem that the burr 39 becomes higher than the reference face 33 does not occur even though the insert 72 is moved relative to the holder in a direction where the insert 72 protrudes forward relative to the holder by the length corresponding to the step of the border 40. Therefore, the forward movement of the insert 72 in the axial direction of the insert is adjusted.

The resin lens 1 is molded by the injection mold that includes the movable mold and the stationary mold, the second face 11 of the optical functional section 2 is molded by the insert 71, and the first face 12 is molded by the insert 72. Further, the first face 12 including the reference face 33 is formed by the insert 72 on the border 40, which is formed slightly outside the step 38, as well as on the optical functional face 22 of the optical functional section 2 on the outside of the reference face 33 of the flange face 32.

Furthermore, the outermost peripheral portion 34, which is formed between the border 40 forming the slightly outer portion of the step 38 and the outer edge of the flange face 32, is molded by the holder that forms the mold outside the insert 72. Meanwhile, the linear portion 36, which is formed at the outer edge of the flange section 3, is formed on the side of the holder. Accordingly, the portion formed by the insert 72 has a circular shape.

The reference face 33 and the optical functional face 22 are formed by the forming face of one insert 72 as described above. Accordingly, as the related art where the optical functional face 22 is formed by the insert 72 and the reference face 33 is formed by the holder, it may be possible to prevent errors that are generated between the direction of the optical functional face 22 and the direction of the reference face 33 based on the slight inclination of the insert 72 by the clearance between the insert 72 and the holder. As a result, it may be possible to improve the accuracy of the resin lens 1.

Further, the linear portion 36 corresponding to the cut portion of the gate section 1c has been formed at the outermost peripheral portion of the resin lens 1. However, since the reference face 33 is formed closer to the center than the linear portion 36 and formed in an annular shape so that the outline of the reference face forms a circle, it may be possible to form the forming face of the insert 72 in a circular shape and to cope with the rotation of the insert 72.

Furthermore, the step 38 is formed at the portion that forms the outer periphery of the flange face 32 forming the border between the insert 72 and the holder, and the border 40 of the flange face 32, which corresponds to the border between the insert 72 and the holder, is formed to be lower than the reference face 33. Accordingly, it may be possible to make the burr 39, which is formed by the resin permeated into the clearance between the insert 72 and the holder, be lower than the reference face 33. Therefore, even though the burr 39 is not removed, interference caused by the burr 39 does not occur when the reference face 33 comes in contact with the receiving face of the mounting frame on which the resin lens 1 is mounted.

What is claimed is:

1. A resin lens comprising:
   an optical functional section that has a first optical functional face and a second optical functional face; and
   a flange section that is formed around the optical functional section,
   the flange section having a flange face at a first optical functional face side of the flange section, and a reference face formed on a part of the flange face, which is configured to be an annular shape, and is used as a positioning reference,
   wherein the reference face is positioned and fixed at the flange section when the resin lens is assembled with an optical device, is used as the positioning reference during positioning and fixing, and is formed on one face of the flange section,
   one side face of the resin lens, including the first optical functional face, the flange face, and the reference face is molded by a first mold that substantially forms the first optical functional face and a second mold that substantially forms the flange section, during molding,
   the reference face is formed in the annular shape at a position that is close to an inner periphery of the flange face, and
   both the reference face and the first optical functional face are molded by the first mold, and a part of the flange face that is closer to an outer periphery than the reference face is molded by the second mold,
   an annular border, which is formed between a part molded by the first mold and a part molded by the second mold, is positioned closer to the outer periphery than the reference face on the part of the flange face,
   a portion of the flange face, including the annular border, located outside of the reference face, which is lower than the reference face, and
   an annular step formed at the portion by lowering an outer portion of the portion adjacent to the annular border that is molded by the second mold below an inner portion of the portion adjacent to the annular border that is molded by the first mold,
   the outer portion and the inner portion are substantially annular.

2. The resin lens according to claim 1,
   wherein the flange section is formed in a substantially circular shape, has a linear portion at the outer periphery, the linear portion corresponding to a portion to be cut after molding and extending in a direction substantially orthogonal to a radial direction of the flange section formed in a substantially circular shape, and
   a peripheral radius of the annular-shaped reference face formed by the first mold is smaller than a distance between the center of the optical functional section and the linear portion in the radial direction.

3. The resin lens according to claim 1,
   wherein a difference in height between the reference face and the portion including the annular border, which is lower than the reference face at a position closer to the outer periphery than the reference face, is larger than a length of a burr that is made of a resin permeated into a clearance between the first and second molds and protrudes in an optical axis direction.

4. A resin objective lens according to claim 1,
   wherein the flange section is formed in a substantially circular shape, and includes a linear portion at the outer periphery, the linear portion corresponding to a portion to be cut after molding and extending in a direction substantially orthogonal to a radial direction of the flange section formed in a substantially circular shape, and
   a peripheral radius of the annular reference face is smaller than a distance between the center of the optical functional section and the linear portion in the radial direction.

5. A resin objective lens according to claim 1,
   wherein a difference in height between the reference face and the portion including the annular border is larger than a length of a burr that is made of a resin permeated into a clearance between the first and second molds and protrudes in an optical axis direction.

6. A resin objective lens according to claim 1, further comprising a mirror flange face formed to oppose the flange face on the flange section, the mirror flange face being mirrored.

7. A resin objective lens according to claim 6, wherein the mirror flange face is recessed into the flange section.

8. A method of molding a resin lens that includes an optical functional section that has a first optical functional face and a second optical functional face, and a flange section that is formed around the optical functional section and has a flange face at a first optical functional face side of the flange part and a reference face formed on a part of the flange face, which is configured to be an annular shape and is used as a positioning reference, the reference face being positioned and fixed at the flange section when the resin lens is assembled with an optical device, being used as the reference during positioning and fixing, and being formed on one face of the flange section, the method comprising:

forming the reference face in an annular shape at a position that is close to an inner periphery of the flange face;

molding one side face, including the first optical functional face and the flange face on which the reference face is formed by a first mold that substantially forms an inner part including both the reference face of the flange face and the first optical functional face, and a second mold that substantially forms an outer part which is closer to an outer periphery than the reference face, and includes a circular hole, in which the first mold is rotatably held;

forming a portion, including an annular border between a part molded by the first mold and a part molded by the second mold, lower than the reference face; and forming an annular step at the portion by lowering an outer portion of the portion adjacent to the annular border that is molded by the second mold below an inner portion of the portion adjacent to the annular border that is molded by the first mold, wherein the outer portion and the inner portion are substantially annular.

9. A resin objective lens for an optical pick-up device for a blue-ray recording medium comprising:

an optical functional section that has a first optical functional face and a second optical face; and a flange section that is formed around the optical functional section, the flange section having a flange face at a first optical functional face side of the flange section, and a reference face formed on a part of the flange face, which is configured to be an annular shape, and is used as positioning reference when the resin lens is assembled with an optical device, wherein one side face, including the first optical functional face and the flange face, of the resin lens is molded by a first mold and a second mold during molding, both the reference face and the first optical functional face are molded by the first mold, and a part of the flange face that is closer to an outer periphery than the reference face is molded by the second mold, an annular border, which is formed between the part molded by the first mold and the part molded by the second mold, is positioned closer to the outer periphery than the reference face formed on the part of the flange face, a portion including the annular border located outside of the reference face, which is lower than the reference face, a step formed at the portion by lowering an outer portion of the portion adjacent to the annular border that is molded by the second mold to be lower than an inner portion of the portion adjacent to the annular border that is molded by the first mold, wherein the outer portion forms an outer portion face that is substantially annular.

* * * * *